United States Patent
Chung

(10) Patent No.: US 11,461,516 B2
(45) Date of Patent: Oct. 4, 2022

(54) DEVELOPMENT SYSTEM AND PRODUCTIZATION METHOD FOR DATA STORAGE DEVICE

(71) Applicant: Silicon Motion, Inc., Jhubei (TW)

(72) Inventor: Chien-Chung Chung, Taipei (TW)

(73) Assignee: SILICON MOTION, INC., Jhubei (TW)

( * ) Notice: Subject to any disclaimer, the term of this patent is extended or adjusted under 35 U.S.C. 154(b) by 876 days.

(21) Appl. No.: 16/299,216

(22) Filed: Mar. 12, 2019

(65) Prior Publication Data
US 2019/0384872 A1    Dec. 19, 2019

(30) Foreign Application Priority Data

Jun. 15, 2018  (TW) .................................. 107120765

(51) Int. Cl.
*G06F 30/20*   (2020.01)
*G06F 12/0804*  (2016.01)
*H02J 9/06*   (2006.01)
*G06F 119/06*  (2020.01)

(52) U.S. Cl.
CPC .......... *G06F 30/20* (2020.01); *G06F 12/0804* (2013.01); *G06F 2119/06* (2020.01); *G06F 2212/1032* (2013.01); *H02J 9/061* (2013.01)

(58) Field of Classification Search
CPC .. G06F 30/20; G06F 12/0804; G06F 2119/06; G06F 2212/1032
See application file for complete search history.

(56) References Cited

U.S. PATENT DOCUMENTS

| | | | |
|---|---|---|---|
| 7,003,620 B2 | 2/2006 | Avraham et al. | |
| 2016/0188414 A1 | 6/2016 | Jayakumar et al. | |
| 2017/0091042 A1* | 3/2017 | Chou | G06F 11/1441 |
| 2017/0242467 A1* | 8/2017 | Kelly | G06F 11/0709 |
| 2018/0267827 A1* | 9/2018 | Kanno | G06F 1/263 |
| 2018/0356876 A1* | 12/2018 | Gharpure | G06F 1/26 |

FOREIGN PATENT DOCUMENTS

| | | |
|---|---|---|
| CN | 100428203 A | 4/2007 |
| CN | 102393658 A | 3/2012 |
| TW | 201636770 A | 10/2016 |

* cited by examiner

*Primary Examiner* — Chuen-Meei Gan
(74) *Attorney, Agent, or Firm* — McClure, Qualey & Rodack, LLP

(57) ABSTRACT

A design technology for backup power of data storage device is disclosed. A development system for a data storage device includes a power supply fixture and a host. The host operates the power supply fixture and a data storage device. The data storage device has a non-volatile memory, a controller and a cache memory. The host operates the power supply fixture to power the data storage device, and operates the power supply fixture to trigger the controller to start a power-loss protection procedure at a first time point. According to the time taken by the power-loss procedure, the host optimizes the capacitance of a capacitor for implementation of a backup power supply to be equipped to the data storage device for production.

14 Claims, 3 Drawing Sheets

DEVELOPMENT SYSTEM AND PRODUCTIZATION METHOD FOR DATA STORAGE DEVICE

CROSS REFERENCE TO RELATED APPLICATIONS

This Application claims priority of Taiwan Patent Application No. 107120765, filed on Jun. 15, 2018, the entirety of which is incorporated by reference herein.

BACKGROUND OF THE INVENTION

Field of the Invention

The present invention relates to product development of data storage devices.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

A non-volatile memory typically has its own particular storage characteristics. Considerable computing resources are required. Considering the storage characteristics of non-volatile memory, a data storage device not only uses non-volatile memory to realize long-term data storage, but also has a cache memory (for example, implemented by a DRAM, SRAM, etc.), which is responsible for coping with frequent access requests from the host. In this way, the non-volatile memory is protected from being excessively accessed, and the system performance will be greatly improved. It should be noted that a cache memory usually requires power to maintain the cached data (volatile storage). Therefore, a data storage device is usually equipped with a backup power supply to cope with sudden power-off (SPO) events. When an SPO event occurs, the backup power supply provides backup power to flush the cached data from the cache memory to the non-volatile memory to avoid any loss of the cached data. While being powered by the backup power supply, a power-loss protection (PLP) procedure is performed. How to implement the backup power supply in a low-cost manner is an important issue in the technical field.

BRIEF SUMMARY OF THE INVENTION

The present invention discloses a development technology for a data storage device, which simulates a power-loss protection (PLP) procedure and thereby accurately evaluates the size of a backup power supply that should be paired with the data storage device. For example, the size (capacitance) of a capacitor storing backup power is evaluated. The simulated PLP procedure is adopted in the firmware of the product to cope with sudden power-off (SPO) events (including flushing the cached data for non-volatile storage). In an exemplary embodiment, the PLP procedure is simulated, evaluated and optimized. A proper PLP procedure, therefore, is adopted to form the firmware.

A development system for a data storage device in accordance with an exemplary embodiment of the present invention includes a power supply fixture and a host. The host operates the power supply fixture and a data storage device. The data storage device has a non-volatile memory, a controller and a cache memory. The host operates the power supply fixture to power the data storage device and operates the power supply fixture to trigger the controller to start a power-loss protection procedure at a first time point. According to the time taken by the power-loss procedure, the host optimizes the capacitance of a capacitor for implementation of a backup power supply to be equipped to the data storage device for production.

The controller may flush data from the cache memory to the non-volatile memory in the power-loss protection procedure.

In an exemplary embodiment, the power supply fixture comprises a processor, a power source and a pin connected to the data storage device. The host requests the processor to operate the power source to power the data storage device. The host requests the processor to change a signal on the pin to trigger the controller to perform the power-loss protection procedure at the first time point.

In an exemplary embodiment, the host requests the processor to change the status of the power source and thereby the signal on the pin is changed and the power source originally supplying operational power to the data storage device is switched to supplying backup power to the data storage device. The backup power may degrade to simulate the discharging behavior of the capacitor.

Prior to the first time point, the host may operate the controller to generate demands for data flushing. At a second time point that comes later than the first time point, the host may request the processor to stop the power source from powering the data storage device. At a third time point that comes later than the second time point, the host requests the processor to operate the power source to power the data storage device again and, through the controller, the host verifies the power-loss procedure to determine the time taken by the power-loss procedure. When verification of the power-loss procedure fails, the host may postpone the second time point and repeats the verification of the power-loss procedure to determine the time taken by the power-loss procedure again. In another exemplary embodiment, the host modifies the power-loss procedure when verification of the power-loss procedure fails, and then the host repeats the verification of the power-loss procedure to determine the time taken by the power-loss procedure again.

In an exemplary embodiment, the host requests the processor to evaluate the active current that the power source supplies to the data storage device. Optimization of the capacitance of the capacitor depends on the evaluated active current and the time taken by the power-loss procedure.

The aforementioned technology may be further used to implement a data storage device productization method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
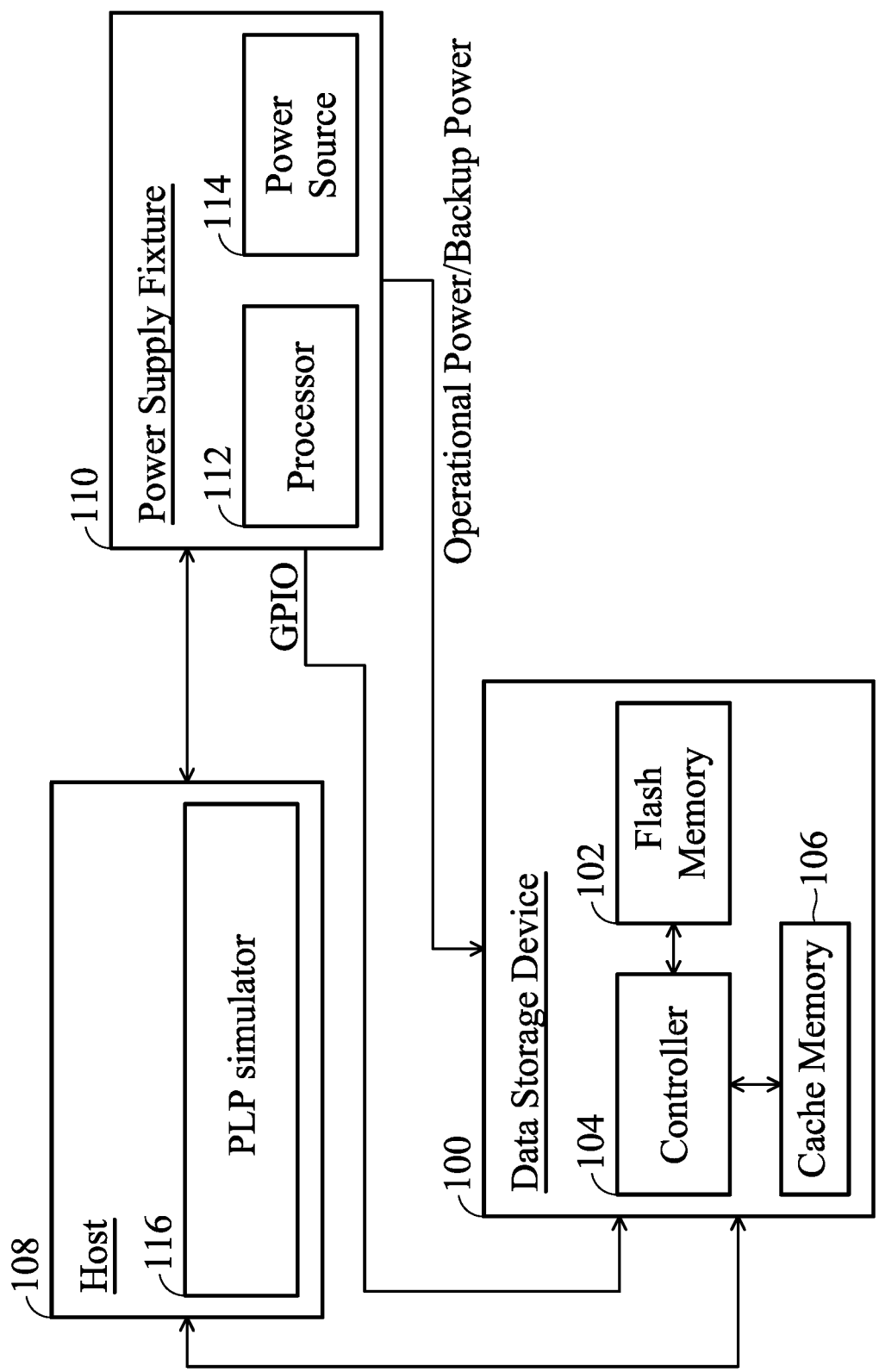
FIG. 1 depicts a development system simulating the PLP procedure in accordance with an exemplary embodiment of the disclosure, which includes a host 108 and a power supply fixture 110 and is coupled to a data storage device 100.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion uses flash memory as an example.

Flash memory is often used as a storage medium in today's data storage devices. Flash memory is often implemented in memory cards, USB flash devices, SSDs, and so on. In another exemplary embodiment, a flash memory may be packaged with a controller to form a multiple-chip package named eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics, as described below.

The host distinguishes data according to logical addresses (e.g., logical block addresses LBAs or global host page numbers GHPs . . . etc.). The physical space of flash memory is divided into a plurality of blocks. Each block includes a plurality of pages. The programming unit may be a page. In some exemplary embodiments, each page is further divided into N sectors, and N is an integer greater than one, such as 4. The smallest programming unit may be a sector. One page of 16 KB may be divided into four sectors and each sector is 4 KB. In an exemplary embodiment, a block is allocated from low to high page number for data storage. As the data is stored, the logical addresses corresponding to each page (or even each sector) must be recorded in mapping tables. Many operations of flash memory are based on the mapping tables. Considerable system resources are required for looking up information in the mapping tables and for management of the mapping tables. In particular, the storage space of the flash memory needs to be erased in units of blocks before being allocated again. The updated data are not overwritten in the same space. After the new version of the data is written to the spared space, the content in the old space is marked as invalid. A block may retain just a few valid data. Thus, garbage collection is required. The sporadic valid data retained in one block is collected to a spared space by garbage collection. A block in which only invalid data remains can be erased and then reused. Frequent data updates of flash memory may cause excessive system resources to be spent on garbage collection. Due to the special storage characteristics of flash memory, considerable computing resources are required in the operations of the flash memory.

Considering the storage characteristics of flash memory, a data storage device using a flash memory as the storage medium usually further includes a cache memory, and the cache memory is designed to cache user data or the mapping tables to cope with the frequent access requests from the host. For example, the frequently-updated user data may be updated in the cache memory and finally written to the flash memory during a predetermined time interval. In an exemplary embodiment, the mapping table cached to the cache memory to speed up the processing of the read commands from the host is stored to the cache memory as a whole or is just partially stored to the cache memory. Because of the cache memory, the flash memory is protected from being frequently read and written, which significantly improves the system performance of the data storage device.

The cache memory may be implemented by a DRAM or SRAM and typically requires power to maintain its operations to cache user data or mapping tables. Therefore, the data storage device is usually quipped with a backup power supply to cope with a sudden (unexpected) power-off event (SPO event). When an SPO event occurs, the backup power supply provides backup power to the electronic components on the data storage device, so that the data cached in the cache memory can be quickly flushed to the flash memory without losing data.

The backup power supply is usually implemented by a capacitor, and the capacitor size (capacitance) is preferably proportional to a protection interval required to complete a power-loss protection (PLP) program. The capacitor size also affects the power consumption of electronic components of the data storage device. The estimation of the desired protection interval is important in the design of the backup power supply. In the conventional techniques, no convenient way is introduced to obtain the appropriate value of the protection interval.

The present invention discloses a development apparatus and flow for PLP procedure, by which the length of the protection interval is estimated. The designer equips a backup power supply on the data storage device and the size of the backup power supply depends on the estimated length of the protection interval. The PLP procedure, therefore, operates normally. The user data or mapping table cached in the cache memory is successfully flushed to the flash memory without being affected by the SPO event.

In the development apparatus and flow for PLP procedure, the PLP procedure is preferably started by a command or signal that indicates the SPO event (SPO indicating command or signal). In addition to flushing data from the volatile memory to the flash memory for non-volatile storage, the SPO event is record during the PLP procedure. When the data storage device gains power again, the record of the SPO event is detected and a sudden (unexpected) power-off recovery procedure (SPOR procedure) starts. The program interrupted by the SPO event resumes. The mapping tables lost due to the SPO event may be rebuilt.

FIG. 1 depicts a development system simulating the PLP procedure in accordance with an exemplary embodiment of the disclosure. The development system includes a host 108 and a power supply fixture 110 and is coupled to a data storage device 100. The data storage device 100 includes a flash memory 102, a controller 104, and a cache memory 106. The data storage device 100 has not been equipped with a backup power supply.

As shown, the host 108 is coupled to the data storage device 100. The host 108 provides a power-loss protection (PLP) simulator 116 to test the data storage device 100. According to the PLP simulator 116, the host 108 outputs a read command or a write command to the data storage device 100. The PLP simulator 116 may be implemented by programs to be run by the host 108. The host 108 is further coupled to the power supply fixture 110 to operate the power supply fixture 110 according to the PLP simulator 116.

The power supply fixture 110 has a processor 112 and a power source 114. According to the PLP simulator 116, power supply commands transmitted to the processor 112 and, accordingly, the processor 112 controls the operations of the power source 114. The power supply commands include: supplying operational power; stopping supplying operational power; supplying backup power; and stopping supplying backup power. The power source 114 may provide operational power or backup power to the data storage device 100. The operational power may or may not be equal to the backup power. When the two are not equal, it is preferable for the operational power to provide a stable supply voltage, and the backup power simulates the capacitor discharging behavior. The power supply fixture 110 preferably includes a general-purpose input/output (GPIO) interface or pin that is coupled to the data storage device 100. According to the received power supply command, the processor 112 may output an SPO indicating command or signal to the data storage device 100 and, accordingly, the data storage device 100 starts the PLP procedure. In another exemplary embodiment, rather than being transmitted from the power supply fixture 110, the SPO indicating command or signal is transmitted from the host 108 through a GPIO interface between the host 108 and the data storage device 100.

The PLP simulator 116 first operates the data storage device 100 in a normal mode, and uses a power supply command to operate the power supply fixture 110 to supply operational power to the data storage device 100. When the data storage device 100 is powered by the operational power, the PLP simulator 116 may test whether the data storage device 100 operates normally. For example, it is determined whether the commands from the host 108 (requested by the PLP simulator 116) or the programs (e.g. for garbage collection) that the data storage device 100 starts spontaneously are correctly executed.

When it is determined that the data storage device 100 operates correctly in the operational power, the PLP simulator 116 starts timing and outputs another power supply command to stop the power supply fixture 110 from supplying operational power to the data storage device 100 and operate the power supply fixture 110 to supply backup power to the data storage device 100. According to the power supply command received this time, the processor 112 drives the power source 114 to supply backup power to the data storage device 100 and outputs an SPO indicating command or signal to the data storage device 100 through the GPIO interface. Upon receipt of the SPO indicating command or signal, the data storage device 100 enables/activates the PLP procedure and records the SPO event.

Later, the PLP simulator 116 stops the power supply fixture 110 from supplying backup power to the data storage device 100 and stops timing to obtain a discharging time. The PLP procedure completes the test and obtains the discharging time of the simulated capacitor. The discharging time should not be less than the time required to execute the PLP procedure.

Later, the PLP simulator 116 outputs another power supply command to operate the power supply fixture 110 to supply operational power to the data storage device 100 again. According to the power supply command received this time, the processor 112 drives the power source 114 to supply operational power to the data storage device 100 and outputs a rebooting command or signal to the data storage device 100 through the GPIO interface. Upon receiving the rebooting command or signal and restarting, the data storage device 100 obtains the record of the SPO event and initiates an SPOR procedure. After the SPOR procedure, the data storage device 100 enters the normal mode. The host 108 can access the data storage device 100 and determine whether the data storage device 100 operates normally without losing any data.

In another exemplary embodiment, in response to a power supply command, the processor 112 drives the power source 114 to supply the operational power. After operational power has lasted for a charging time, the processor 112 outputs a rebooting command or signal to the data storage device 100 through the GPIO interface. The charging time is for the simulation of the backup capacitor. In an exemplary embodiment, the charging time is a preset value or is set through the power supply command.

In another exemplary embodiment, the PLP simulator 116 outputs a power supply command to operate the power supply fixture 110 to supply operational power to the data storage device 100 again. After operational power has lasted for a charging time, the PLP simulator 116 outputs another power supply command to request the processor 112 to output a rebooting command or signal to the data storage device 100. In this exemplary embodiment, the charging time is set by the PLP simulator 116.

Figure 2:
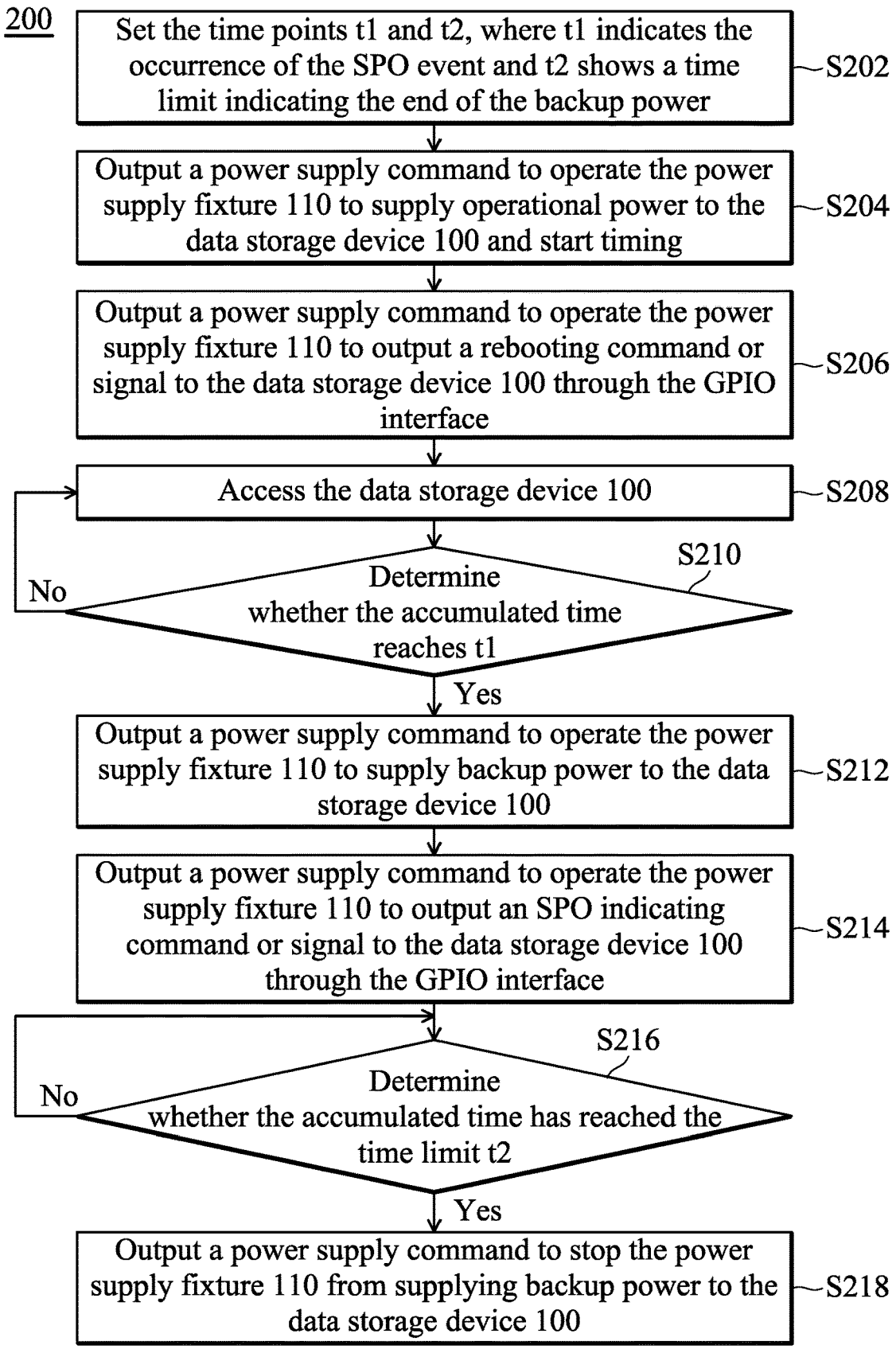
FIG. 2 is a flowchart depicting a test method (test process 200) for PLP procedure in accordance with an exemplary embodiment of the present invention.

FIG. 2 is a flowchart depicting a test method for PLP procedure in accordance with an exemplary embodiment of the present invention. In step S202, the PLP simulator 116 at the host 108 side sets the time points t1 and t2, where t1 indicates the occurrence of the SPO event and t2 shows a time limit indicating the end of the backup power, and t1 and t2 may be fixed values or may be set by the developer through a user interface provided at the host 108 side. The values of t1 and t2 may be stored to the PLP simulator 116 at the host 108 side. The difference between t1 and t2 is provided to simulate the discharging behavior of a backup capacitor.

In step S204, the PLP simulator 116 at the host 108 side outputs a power supply command to operate the power supply fixture 110 to supply operational power to the data storage device 100 and starts timing. Upon receiving the power supply command, the power supply fixture 110 begins to supply operational power to the data storage device 100.

In step S206, the PLP simulator 116 at the host 108 side outputs a power supply command to operate the power supply fixture 110 to output a rebooting command or signal to the data storage device 100 through the GPIO interface. Upon receiving the power supply command, the power supply fixture 110 outputs the rebooting command or signal to the data storage device 100 through the GPIO interface to reboot the data storage device 100.

Step S206 is preferably performed later than step S204 (for example, after a charging time, such as 0.3 seconds). The charging time is for simulation of the backup capacitor. In another exemplary embodiment without considering the charging time, step S204 and step S206 are performed approximately synchronously, and the execution order is not limited. In another embodiment, step S206 may be combined to step S204. When it receives the power supply command from the PLP simulator 116 in step S204, the power supply fixture 110 outputs the rebooting command or signal to the data storage device 100 through the GPIO interface. This may take place simultaneously with the supply of operational power, or after the charging time.

In step S208, the PLP simulator 116 at the host 108 side accesses the data storage device 100. After the data storage device 100 completes a booting procedure, the data storage device 100 is in a normal mode. The PLP simulator 116 may output access commands to the data storage device 100 and determine whether the access commands are correctly executed without data loss. After the booting procedure for rebooting, the PLP simulator 116 may request the data storage device 100 to return a log file or debug information (SMART) to confirm that an SPOR procedure has been executed correctly. The PLP simulator 116 may request the data storage device 100 to return whether an SPO event is in record.

In step S210, the PLP simulator 116 at the host 108 side determines whether the accumulated time reaches t1. In an exemplary embodiment, t1 is 60 seconds. After starts the timer, the PLP simulator 116 determines whether the accumulated time reaches t1, 60 seconds. If yes, step S212 is performed.

In step S212, the PLP simulator 116 at the host 108 side outputs a power supply command to operate the power supply fixture 110 to supply backup power to the data storage device 100. The PLP simulator 116 outputs the power supply command to change the power supply fixture 110 to supply backup power rather than operational power to the data storage device 100.

In step S214, the PLP simulator 116 at the host 108 side outputs a power supply command to operate the power supply fixture 110 to output an SPO indicating command or signal to the data storage device 100 through the GPIO interface.

Step S212 and step S214 are preferably performed approximately synchronously, and the execution order is not limited. In another exemplary embodiment, step S212 may be omitted. When it receives a power supply command from the PLP simulator 116 in step S214, the power supply fixture 110 outputs an SPO indicating command or signal to the data storage device 100 through the GPIO interface while it continues to supply operational power to the data storage device 100.

When it receives the SPO indicating command or signal, the data storage device 100 immediately enters the PLP mode (it starts the PLP procedure). The PLP procedure flushes data from the cache memory 106 to the flash memory 102 at a high speed and records the occurrence of the simulated SPO event.

In step S216, the PLP simulator 116 at the host 108 side determines whether the accumulated time has reached the time limit t2. In an exemplary embodiment, t2 is 60.2 seconds. The PLP simulator 116 determines whether the accumulated time has reached t2, 60.2 seconds. If yes, step S218 is performed. If the PLP procedure finishes prior to the time limit t2, the data storage device 100 may enter a standby mode or be shut down.

In step S218, the PLP simulator 116 at the host 108 side outputs a power supply command to stop the power supply fixture 110 from supplying backup power to the data storage device 100.

The difference between t1 and t2 is 0.2 seconds, which is used to simulate the discharging time of a backup power capacitor. If the PLP procedure can be completed in 0.2 seconds, the PLP procedure is in compliance. Conversely, the PLP procedure may not be completed in 0.2 seconds. When the step S208 is performed again and the data storage device 100 is accessed, the PLP simulator 116 at the host 108 side identifies the data loss and notifies the developer. The developer may modify the PLP procedure or increase the difference between t1 and t2, for example, increasing the difference from 0.2 seconds to 0.25 seconds. The developer may repeat the test method 200 to modify and verify the PLP procedure, or set the value of the time limit t2. In an exemplary embodiment, another time point t3 later than t2 is introduced. The host 108 may request the processor 112 to drive the power source 114 to re-power the data storage device 100 at the time point t3. The host 108, therefore, can operate the controller 104 to verify the PLP procedure performed prior to the time point t2. The protection interval required to perform the PLP procedure is successfully evaluated.

Figure 3:
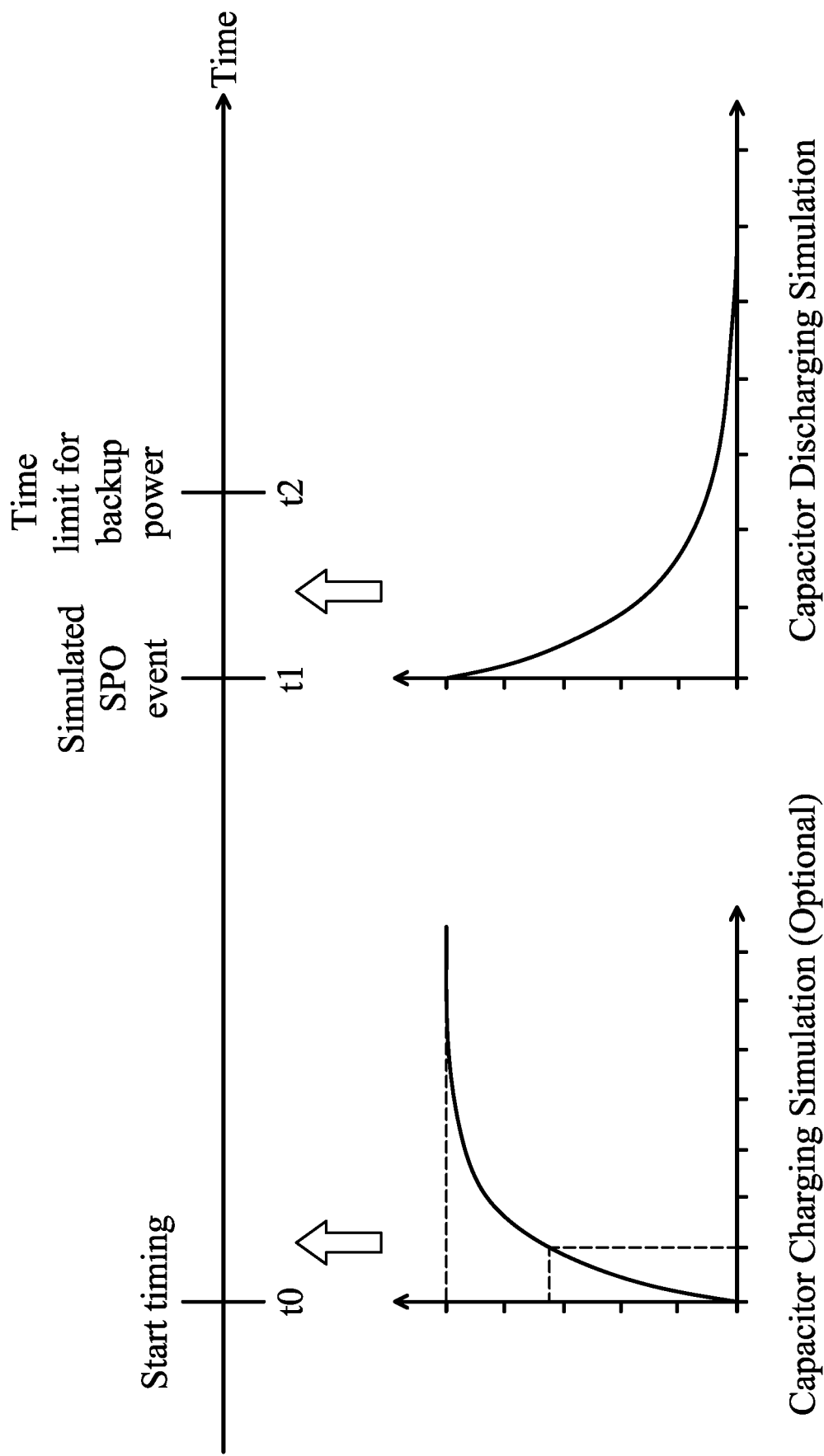
FIG. 3 is a timing diagram depicting the way the PLP simulator 116 operates the power supply fixture 110.

FIG. 3 is a timing diagram depicting the way the PLP simulator 116 operates the power supply fixture 110. Step S204 is performed at a time point to. Step S210 is performed to check whether the timing reaches the time point t1 (indicating an SPO event). From t0 to t1, the power supply fixture 110 supplied operational power to the data storage device 100. The PLP simulator 116 accesses the data storage device 100. From t1 to t2, the power supply fixture 110 supplies backup power to the data storage device 100. The data storage device 100 performs the PLP procedure. The PLP procedure is preferably completed before the time limit t2. When reaching the time limit t2, the PLP simulator 116 stops the power supply fixture 110 from supplying backup power to the data storage device 100. The simulation of the discharging behavior of the backup power capacitor finishes.

The following steps may be considered to set the value of the time limit t2. The time limit t2 may be initiated to a preset value, for example, 60.2 seconds. Every time the test process 200 completes, a loop number is incremented by one. The PLP simulator 116 checks if the loop number reaches the target value (for example, 5000 times). Before reaching the target value, the test process 200 is repeated. When an abnormality is detected in step S208, the value of the time limit t2 is adjusted next time the step S202 is performed. For example, the time limit may be increased by 0.01 seconds. The test process 200 is repeated according to the new time limit t2. When the loop number reaches the target value, the time limit t2 is regarded as having being adjusted to a proper value. The PLP simulator 116 may submit a report which details the optimized time limit t2 or the optimized firmware version.

After determining the value of the time limit t2, t1 is subtracted from t2. Considering the time difference and an active current of the data storage device 100, the developer may evaluate the size of the optimized backup power capacitor. The evaluated value may be used to productize the backup power supply. The amount of active current may be evaluated by summing up the current of the components of the data storage device 100 according to the component specifications. In another exemplary embodiment, the power supply fixture 110 includes an active current measurement function. As requested by the host 108, the processor 112 evaluates the amount of active current that the power source 114 supplies to the data storage device 100.

The optimized firmware version is adopted in productizing the data storage device 100, and is burned into the data storage device 100.

Any techniques performed in the product development period to simulate the PLP procedure to evaluate the best backup power or for the optimization of the product firmware are in the scope of the present invention. The present invention further discloses a method for productizing data storage devices according to the foregoing technology, including the foregoing operations of the power supply fixture 110 and the data storage device 100.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A development system for a data storage device, comprising:
   a power supply fixture; and
   a host, operating the power supply fixture and a data storage device, wherein the data storage device has a non-volatile memory, a controller and a cache memory, wherein:
   the host operates the power supply fixture to power the data storage device, and operates the power supply fixture to trigger the controller to start a power-loss protection procedure at a first time point;
   according to time taken by the power-loss procedure, the host optimizes capacitance of a capacitor for implementation of a backup power supply to be coupled to the data storage device for production;
   the power supply fixture comprises a processor and a power source, and the host requests the processor to operate the power source to power the data storage device till a second time point that comes later than the first time point;
   at a third time point that comes later than the second time point, the host requests the processor to operate the power source to power the data storage device again and, through the controller, the host verifies the power-loss procedure to determine the time taken by the power-loss procedure; and
   when verification of the power-loss procedure fails, the host postpones the second time point and repeats the verification of the power-loss procedure to determine the time taken by the power-loss procedure again.

2. The development system as claimed in claim 1, wherein:
   the controller flushes data from the cache memory to the non-volatile memory in the power-loss protection procedure.

3. The development system as claimed in claim 2, wherein:
   the power supply fixture further comprises a pin connected to the data storage device; and
   the host requests the processor to change a signal on the pin to trigger the controller to perform the power-loss protection procedure at the first time point.

4. The development system as claimed in claim 3, wherein:
   the host requests the processor to change the status of the power source and thereby the signal on the pin is changed and the power source originally supplying operational power to the data storage device is switched to supplying backup power to the data storage device; and
   the backup power degrades to simulate discharging behavior of the capacitor.

5. The development system as claimed in claim 3, wherein:
   prior to the first time point, the host operates the controller to generate demands for data flushing.

6. The development system as claimed in claim 3, wherein:
   the host requests the processor to evaluate an active current that the power source supplies to the data storage device; and
   optimization of the capacitance of the capacitor depends on the evaluated active current and the time taken by the power-loss procedure.

7. The development system as claimed in claim 1, wherein:
   when verification of the power-loss procedure fails, the host further modifies the power-loss procedure and repeats the verification of the power-loss procedure to determine the time taken by the power-loss procedure again.

8. A method for productization of a data storage device, comprising:
   providing a power supply fixture;
   operating the power supply fixture and a data storage device, wherein the data storage device has a non-volatile memory, a controller and a cache memory;
   operating the power supply fixture to power the data storage device, and operating the power supply fixture to trigger the controller to start a power-loss protection procedure;
   according to the time taken by the power-loss procedure, optimizing capacitance of a capacitor for implementation of a backup power supply to be equipped to the data storage device for production;
   providing a processor and a power source on the power supply fixture, and using the processor to operate the power source to power the data storage device till a second time point that comes later than the first time point;
   at a third time point that comes later than the second time point, using the processor to operate the power source to power the data storage device again, and using the controller to verify the power-loss procedure to determine the time taken by the power-loss procedure; and
   when verification of the power-loss procedure fails, postponing the second time point and repeating the verification of the power-loss procedure to determine the time taken by the power-loss procedure again.

9. The method as claimed in claim 8, wherein:
   the controller flushes data from the cache memory to the non-volatile memory in the power-loss protection procedure.

10. The method as claimed in claim 9,
    wherein the power supply fixture has a pin connected to the data storage device, and the method uses the processor to change a signal on the pin to trigger the controller to start the power-loss protection procedure at the first time point.

11. The method as claimed in claim 10, wherein:
    the processor is requested to change the status of the power source and thereby the signal on the pin is changed and the power source originally supplying operational power to the data storage device is switched to supplying backup power to the data storage device; and the backup power degrades to simulate discharging behavior of the capacitor.

12. The method as claimed in claim 10, further comprising:
prior to the first time point, operating the controller to generate demands for data flushing.

13. The method as claimed in claim 10, further comprising:
operating the processor to evaluate the active current that the power source supplies to the data storage device, wherein optimization of the capacitance of the capacitor depends on the evaluated active current and the time taken by the power-loss procedure.

14. The method as claimed in claim 8, further comprising:
when verification of the power-loss procedure fails, further modifying the power-loss procedure and repeating the verification of the power-loss procedure to determine the time taken by the power-loss procedure again.

\* \* \* \* \*